United States Patent Office 3,172,770
Patented Mar. 9, 1965

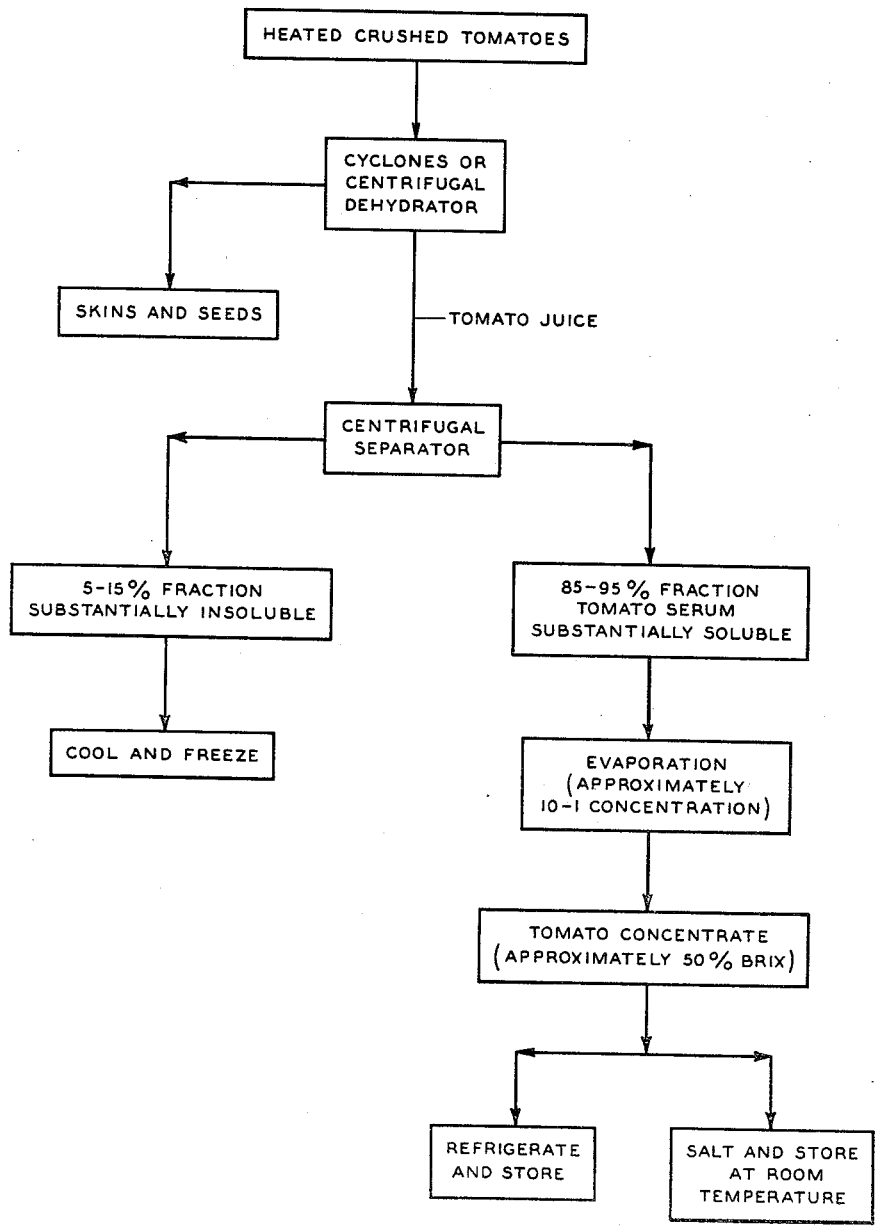

3,172,770
PROCESS FOR PREPARING TOMATO CONCENTRATE
Ralph A. Miller, Haddonfield, N.J., assignor to Campbell Soup Company, Camden, N.J., a corporation of New Jersey
Filed Mar. 23, 1962, Ser. No. 181,952
4 Claims. (Cl. 99—205)

This invention relates to a method for preparing tomato concentrations and, more particularly, to a method for preparing such concentrations for subsequent use in making tomato soup and similar tomato products.

Large quantities of tomatoes are processed and canned annually as tomato soup, tomato juice, vegetable juices, tomato catsup, and similar tomato products. To attain the desired taste and color, it is the usual practice to process and can such products during the peak of the tomato harvesting season when ripe tomatoes are available in sufficient quantity. Thus, the entire annual requirements for such products are processed and canned during a relatively short period. This practice not only requires a relatively large facility for processing and canning, but requires large warehousing facilities to store the products until needed.

Tomatoes, particularly when ripe and most suited for processing, are easily bruised and damaged. Hence, such tomatoes cannot be readily shipped over any great distance. It, therefore, generally has been the practice to locate facilities for processing and canning tomato products in tomato growing regions. These regions are usually some distance from the area in which the products are marketed. Thus, after canning, the product must be shipped over substantial distances.

The size of the tomato crop in a particular area depends, to a large extent, on natural elements. Thus, the amount of sun, the amount of rain, and temperature during the growing season have a very marked effect on the quantity and quality of tomatoes which may be available during a particular season. If the elements during the growing season have been favorable, the quantity of quality tomatoes available at the time of harvest may exceed the capacity of the cannery. When this occurs, substantial quantities of tomatoes may be wasted because of the lack of canning facilities. Conversely, if the elements have been unfavorable, a sufficient quantity of tomatoes of suitable quality may not be available to fulfill the cannery's needs. In either event, substantial waste results.

Realizing the inherent inefficiencies and wastes of present practices, attempts have heretofore been made to concentrate tomatoes at the time of harvest and to preserve and store the concentrate. Instead of processing, canning and storing large quantities of finished products at the time of harvest, by preparing a suitable concentrate from the tomatoes, the concentrate could be used to prepare and can particular products as demand arose. Thus, a considerable portion of the tomato crop could be processed into a single item, the concentrate. This would substantially reduce the need for storage facilities. Of probable equal importance, such concentrate would be more compact than the processed finished product and could be readily shipped, in bulk, to processing plants and canneries more conveniently located to the point where the finished product is to be marketed. With such a concentrate, of course, the tomato crop abundance in one harvesting area could be more readily employed to overcome a shortage of tomatoes in another area.

Despite the many advantages and obvious economies to be enjoyed through their use, the concentration of tomatoes for later use in the formulation of tomato soup and like products has met with little success. For example, tomatoes have been concentrated and canned as a tomato paste and, subsequently, utilized as the tomato base for soup. However, the soup made from such pastes lacked the natural taste of tomato soup prepared from fresh tomatoes and was, therefore, inferior.

One of the objects of the present invention is to prepare, from fresh tomatoes, a concentrate for storage and subsequent use in making acceptable tomato soup, and like products.

A further object is to prepare such a concentrate which may be preserved and stored over extended periods of time before use.

A still further object is to prepare such a concentrate which, when used after storage, will produce tomato soup, and like products, in which the taste and color will be substantially identical to similar products made from fresh tomatoes.

These and other objects will be more apparent from the following description and the attached drawing in which:

The drawing is a flow sheet of the process of the instant invention.

In the instant invention, ripe tomatoes are first prepared in the conventional manner and passed through cyclones or centrifugal dehydrating equipment to separate the juice from seeds, skins, and other waste material. The tomato juice is then passed through a centrifuged separator to separate the juice into two fractions, the first fraction, representing from approximately 5 to 15% of the original tomato juice, contains substantially all of the insolubles. The second fraction, representing approximately 85 to 95% of the original tomato juice, contains the solubles which, conventionally, are referred to as tomato serum.

After the tomato juice has been separated into the fractions, the first fraction containing the insolubles is cooled, packed in containers of suitable size, and quick-frozen. It is important that this fraction, after it is frozen, be maintained and stored in its frozen condition until used.

The second fraction, that is, the fraction containing the solubles, is concentrated to approximately one-tenth of its original volume. Such concentration can be accomplished by well-known low temperature evaporation processes or by freeze concentration processes in which the water phase is frozen into small ice crystals which are then removed by centrifugation. The second fraction, when properly concentrated, will be approximately 50° Brix. The concentrated tomato serum contains the fresh tomato flavor. Where properly preserved the fresh tomato flavor in the concentrate can be retained for extended periods of time.

To preserve the concentrated tomato serum and to retain the fresh tomato flavor in the concentrate, the concentrate may be stored at a temperature below 32° F. or may be preserved by adding salt to the concentrate in an amount sufficient to produce a salt concentration of approximately 80% saturation of the free moisture. Where it is intended to recombine the concentrate, or second fraction, with the first fraction after but a limited period of storage, it may be preferred to leave the concentrated second fraction unsalted and to store the unsalted concentrate at a temperature below 32° F. However, where storage is intended for prolonged periods, it is preferred to salt and fill the concentrate into suitable containers and to store the salted concentrate at room temperatures.

Preferably the tomatoes are processed and the two fractions prepared in the tomato producing region during the tomato harvest. Only a relatively small amount of equipment is required for this processing and large quantities of concentrate can be prepared. After the first fraction has been frozen and the second fraction has been concentrated and salted, the two fractions may be stored for extended periods of time before use. It is, however, important that the frozen fraction be stored and maintained in its frozen condition until used.

The frozen and concentrated fractions may be withdrawn from storage and used as required or the two fractions may be shipped to a processing cannery at some distance removed from the growing region. Thus, the tomatoes can be separated, frozen and concentrated into relatively compact units and shipped to a processing cannery at a considerable distance from the growing region and more convenient to the market where the finished product is to be marketed. As required, the concentrated fractions can be recombined and employed, similar to the juices of fresh tomatoes, in preparing and canning the finished product.

In preparing finished products from the separated frozen and salted fractions, consideration must be given to the salt which was added to the concentrated fraction of the concentrate. The amount of salt added, that is, approximately 80% saturation of the free moisture in the concentrated fraction, does not exceed the amount of salt normally added in preparing tomato soup and similar products. Thus, in some instances, the addition of salt when tomato soup or a similar product is made from the concentrate may not be required. This can be determined, in well-known manners, at the time the fractions are recombined and the final product formulated.

The two fractions prepared in accordance with the instant invention, when recombined, can be employed to prepare tomato soup, tomato juice, vegetable juices, tomato catsup and similar tomato products. When so used the finished product is comparable to products made with fresh tomatoes in both flavor and color.

Of particular advantage in the process of the instant invention is the manner in which the fractions can be recombined. Where it is desired to prepare finished tomato products concurrently with the preparation of the fractions, the two fractions may be recombined immediately without quick freezing the first fraction or refrigerating or salting the second fraction. On the other hand, where a relatively short storage period is contemplated, the first fraction may be quick frozen and the second fraction may be refrigerated to a temperature below 32° F. Finally, where extended storage periods are contemplated or where, for other reasons, it is preferred to store the second fraction at room temperature, the first fraction may be quick frozen and the second fraction may be salted.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. The process of preparing a tomato concentrate for storage and use in preparing tomato products, the steps which comprise separating the juice from fresh tomatoes, dividing said juice into a plurality of fractions, one of said fractions containing substantially all of the insolubles in said juice and the other of said fractions containing substantially all the solubles in said juice, cooling and freezing said fraction containing substantially all of said insolubles and concentrating said fraction containing said solubles to a volume of approximately one-tenth of its original volume, salting said concentrated fraction to a salt concentration of approximately 80% of saturation of the free moisture therein.

2. The process of preparing a tomato concentrate for storage and use in preparing tomato products, the steps which comprise separating the juice from fresh tomatoes, dividing said juice into two fractions, one of said fractions containing substantially all of the insolubles in said juice and the other of said fractions containing substantially all the solubles in said juice, cooling and quick-freezing said fraction containing substantially all of said insolubles and concentrating said fraction containing said solubles to a volume of approximately one-tenth of its original volume, salting said concentrated fraction to a salt concentration of approximately 80% of saturation of the free moisture therein.

3. The process as recited in claim 1 wherein the concentration of said fraction containing said solubles is by low temperature evaporation.

4. The process as recited in claim 1 wherein the concentration of said fraction containing said solubles is by freezing the water phase in said fraction into small ice crystals and removing said ice crystals by centrifugation.

References Cited in the file of this patent
UNITED STATES PATENTS

| | | |
|---|---|---|
| 2,187,572 | Meinzer | Jan. 16, 1940 |
| 2,395,498 | Noyes | Feb. 26, 1946 |
| 2,419,909 | Noyes | Apr. 29, 1947 |
| 2,647,059 | Wenzelberger | July 28, 1953 |